United States Patent
Hoffman

[15] 3,658,043
[45] Apr. 25, 1972

[54] CLOSED CYCLE POWER SYSTEM

[72] Inventor: Lawrence C. Hoffman, Azusa, Calif.

[73] Assignee: Aerojet-General Corporation, El Monte, Calif.

[22] Filed: Aug. 20, 1969

[21] Appl. No.: 851,586

[52] U.S. Cl. .............................. 123/119 A, 23/281, 23/288, 123/1, 123/3, 60/39.46, 60/39.52, 60/39.59
[51] Int. Cl. .................................. F02b 75/12, F02m 75/06
[58] Field of Search ........ 23/221, 281, 282, 277 C, 288.43 F; 123/1, 119 A, 119 E, 3; 60/39.52, 39.46, 39.59

[56] References Cited

UNITED STATES PATENTS

| | | | |
|---|---|---|---|
| 1,843,999 | 2/1932 | White | 23/288.3 F UX |
| 2,017,481 | 10/1935 | Von Opel | 123/1 |
| 2,325,619 | 8/1943 | Lusholm | 60/39.46 X |
| 2,862,482 | 12/1958 | Hart | 123/119 E X |

Primary Examiner—Wendell E. Burns
Attorney—Edward O. Ansell, D. Gordon Angus and Donald W. Graves

[57] ABSTRACT

Apparatus for supplying breathing fluid to an internal combustion engine or the like. A lung humidifies oxygen from a source of oxygen such as $H_2O_2$ and a catalyst pack or gaseous or liquid oxygen to a mixture of oxygen to the engine. Means, such as a container of caustic solution and water vapor is provided so that the exhaust products from the engine, which includes gaseous oxygen, water vapor and carbon dioxide, are separated. The $CO_2$ is absorbed in the caustic solution and the $O_2$ is recirculated to the lung after it is combined with additional $O_2$.

13 Claims, 4 Drawing Figures

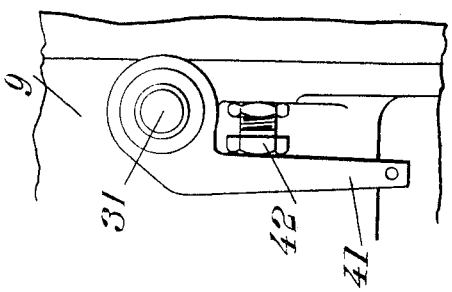
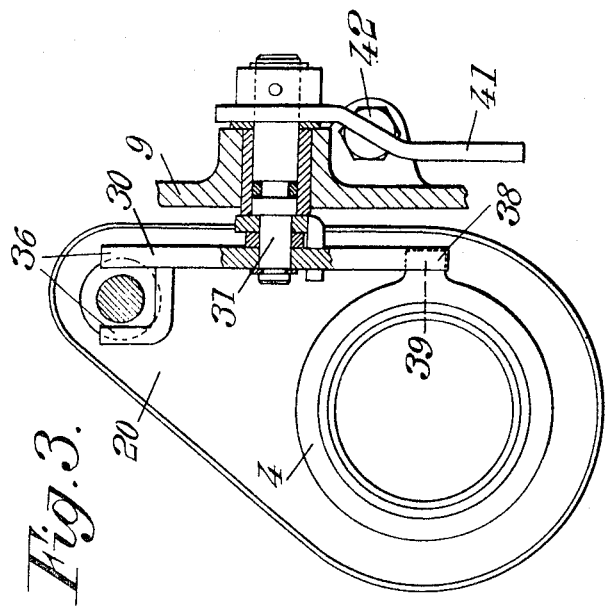

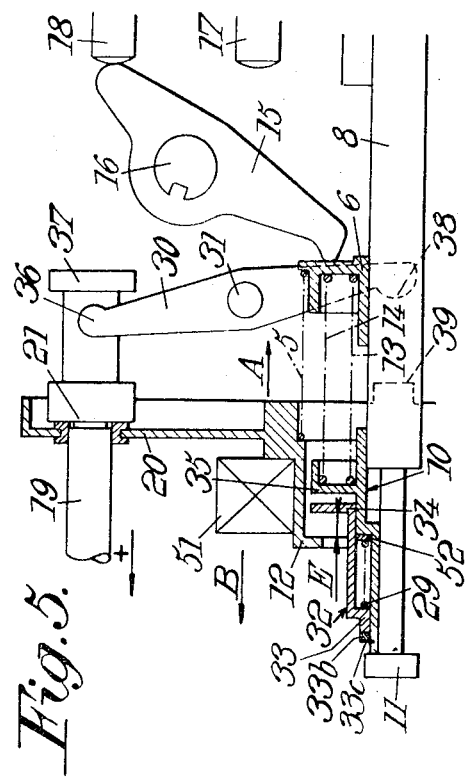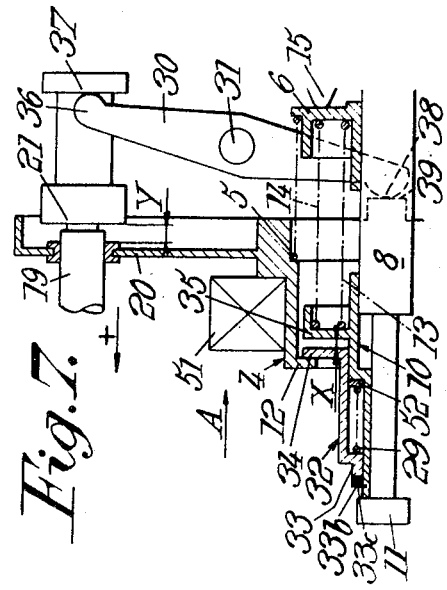

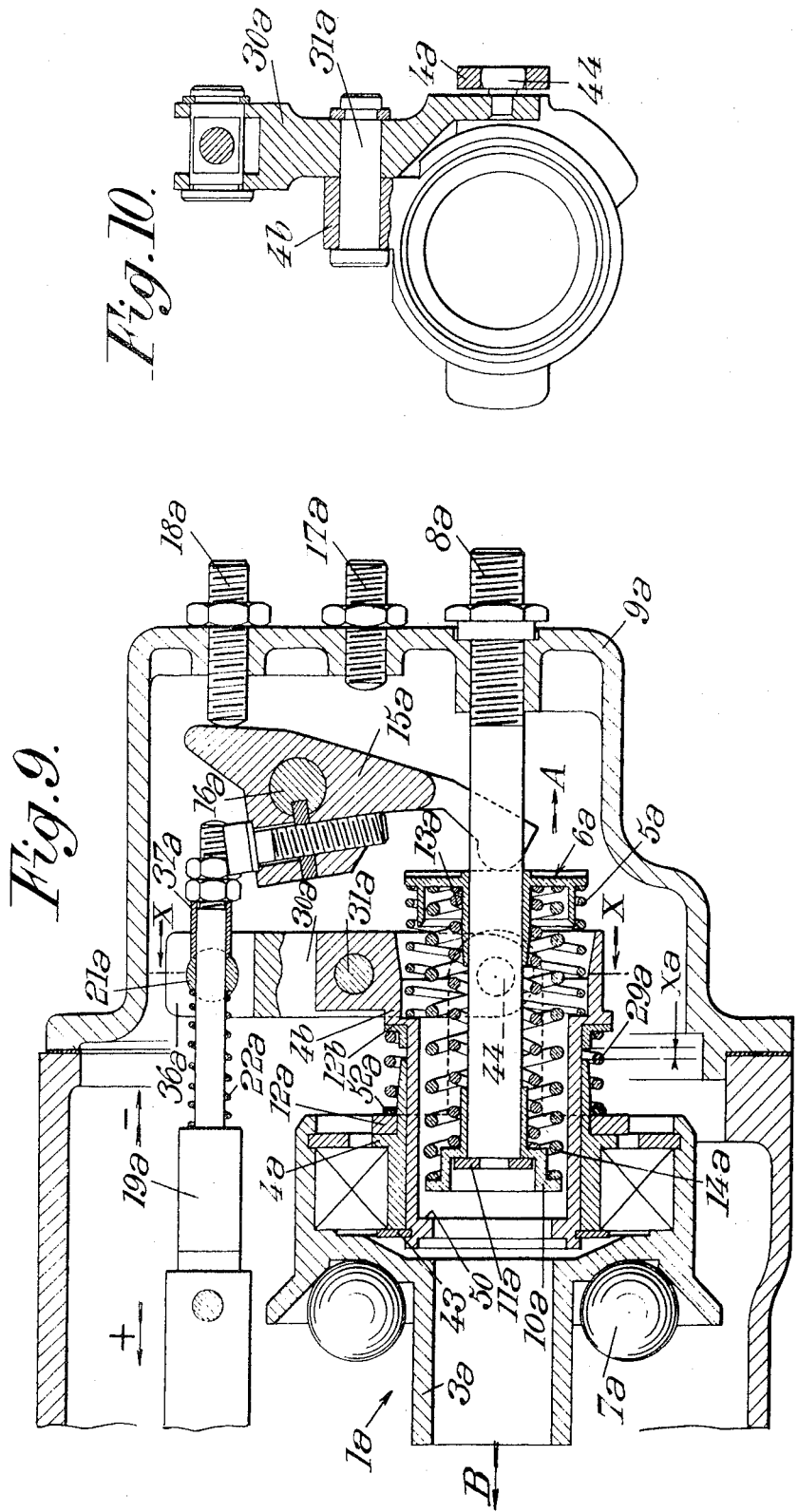

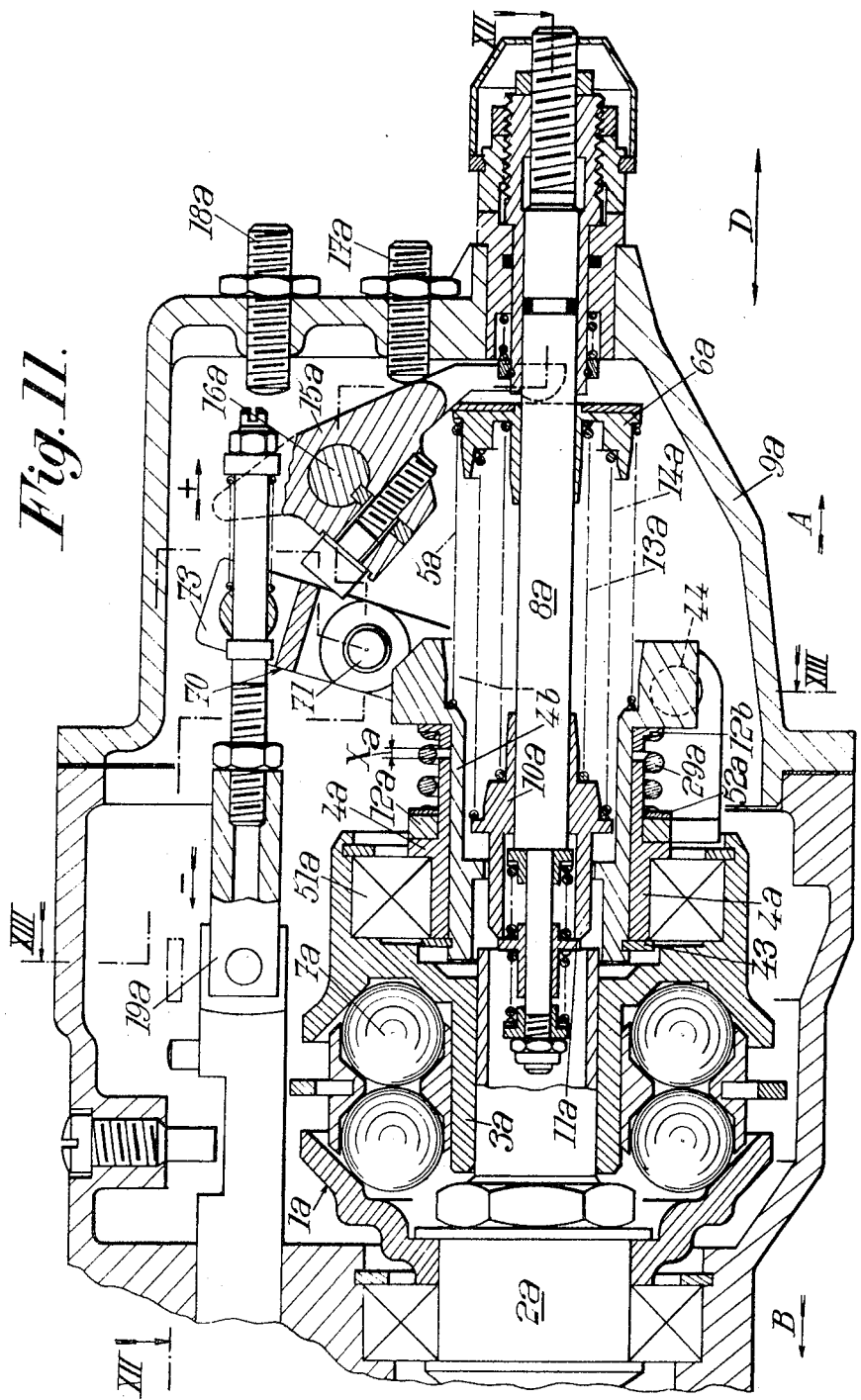

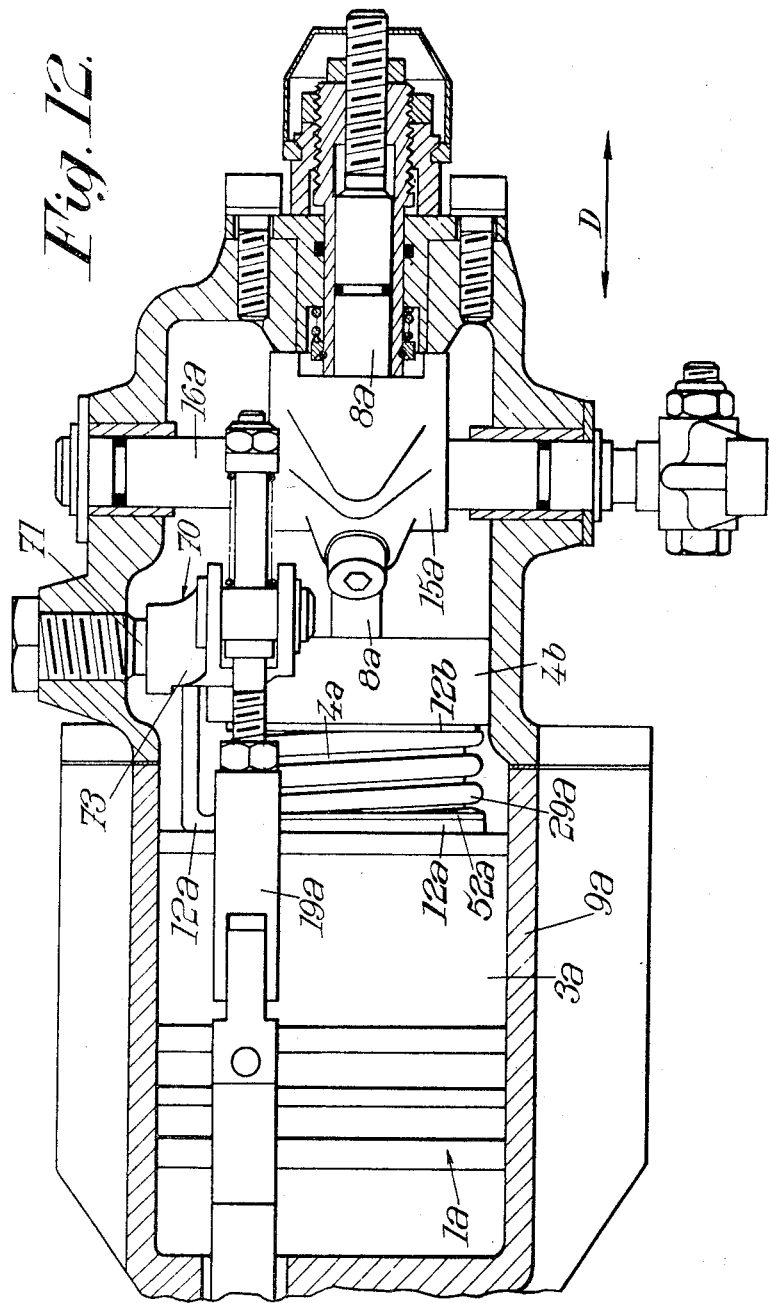

CLOSED CYCLE POWER SYSTEM

This invention relates to a self-contained system for supplying breathing fluid and particularly combustion oxygen, to internal combustion engines and the like.

There are instances where it is not feasible to take oxygen from the surrounding atmosphere for use for internal combustion engines and the like. For example, power systems for underwater sea laboratories and the like are not capable of extracting oxygen from the surrounding water. One technique proposed would be to provide a supply of oxygen whereby oxygen is pumped to the internal combustion engine, the exhaust products of the engine would be discharged into the environmental water. However, the exhaust products of internal combustion engines would be likely to include unused oxygen, so that some oxygen would be wasted by being discharged into the ocean water.

It is an object of the present invention to provide a breathing fluid supply system, and particularly an oxygen supply, which is entirely self-contained and which utilizes the full capabilities of the breathing fluid.

Another object of the present invention is to provide a recirculating oxygen supply system for internal combustion engines, and the like, wherein oxygen is extracted from the exhaust products of the engine and is recirculated to the oxygen intake of the engine.

In accordance with the present invention, an oxygen supply, such as hydrogen peroxide, is utilized to obtain gaseous oxygen which in turn is fed to the intake of an internal combustion engine or the like. At the same time, fuel is supplied to the engine. The exhaust gases from the engine, which ordinarily contain oxygen, water vapor, and carbon dioxide, are separated. By way of example, the exhaust gases may be passed through a solution of potassium hydroxide or other caustic solution to remove carbon dioxide. The remaining oxygen is recirculated to the intake of the engine.

According to one feature of the present invention, the oxygen is humidified in a lung utilizing water and water vapor. According to another feature of the present invention a decomposition chamber is provided for decomposing hydrogen peroxide into water and oxygen.

The above and other features of this invention will be more fully understood from the following detailed description, and the accompanying drawings, in which.

Figure 1:
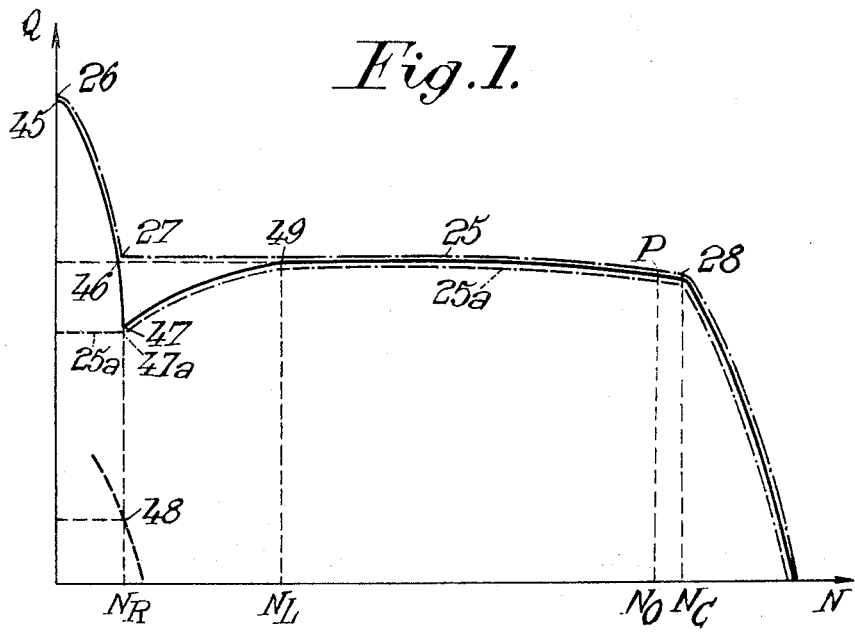
FIG. 1 is a schematic flow diagram of a self-contained recirculating oxygen system for internal combustion engines.

Referring to the drawings, and particularly to FIG. 1, there is illustrated a self-contained recirculating oxygen supply system in accordance with the present invention. The system illustrated in FIG. 1 includes an internal combustion engine 10 such as Series 2-53, Model 5025-800N two-stroke diesel engine, commercially available from General Motors Corporation. It is to be understood, however, that engine 10 may be of any type of internal combustion motor or any other device which uses oxygen and water vapor to breath. Housing 11 is divided into three chambers 12, 13 and 14 by movable diaphragms 15 and 16. Chamber 12 is connected by conduit 17 to variable delivery pump 18 whose outlet is connected through conduit 19 to a first inlet of engine 10. Chamber 12 is adapted to contain a suitable fuel such as a diesel fuel or JP-5 fuel, a kerosene-type jet propellent. It is to be understood that other types of fuel such as kerosene or diesel fuel may be used and the particular fuel used will be dependent upon engine 10.

Conduit 20 is connected to the uppermost portion of chamber 13 above the liquid therein and is in fluid communication with lung 21. Lung 21 contains a quantity of water 22 and includes an outlet conduit 23 connected to the oxygen inlet of engine 10. Also, lung 21 is in fluid communication with the control portion of variable delivery pump 18 by means of conduit 24. Hence, variable delivery pump 18 will deliver propellant through conduit 19 to engine 10 in accordance with the pressure of gas above water 22 within lung 21. Conduits 20, 23 and 24 are all in fluid communication with the region above the surface of water 22 in lung 21.

The exhaust outlet of engine 10 is connected though conduit 25 to condenser 26 and thence through conduit 27 to an inlet of chamber 13 of housing 11 below the liquid surface therein. Chamber 13 contains a quantity of recovery solution adapted to remove carbon dioxide from the exhaust. For example, chamber 13 may contain a caustic solution such as potassium hydroxide (KOH) which absorbs carbon dioxide permitting free oxygen to pass through the solution. Hence, oxygen is discharged through conduit 20 to lung 21. Condenser 26 also is connected to outside water, such as sea water through conduits 28 and 29, pump 30 and conduit 31. Cool salt water from the ocean is continuously circulated through condenser 26 to cool the exhaust products from engine 10. Water in the exhaust products is condensed and discharged into the potassium hydroxide solution within chamber 13.

Conduit 32 is in fluid communication with chamber 13 and is adapted to skim liquid from the upper portion of the chamber and feed it to regulator 33 and valve 34. Valve 34, which is a three-way control valve operable by thermocouple 35 in lung 21, has one inlet connected to conduit 32 and another inlet connected to the output of regulator 33. The outlet of valve 34 is in fluid communication through conduit 36 to conduit 37. Conduit 37 is in fluid communication with the inlet to lung 21 below the surface of water therein. Conduit 38 is in fluid communication with chamber 13 of housing 11 and lung 21 below the water surface. Float control valve 39 is provided in lung 21 to control the flow of fluid into conduit 38. Conduit 38 forms a liquid outlet from lung 21 and a fluid inlet to the bottom of chamber 13 of housing 11.

Chamber 14 of housing 11 is adapted to contain a suitable supply of oxidizer, such as hydrogen peroxide ($H_2O_2$) and is connected via conduit 40 to variable displacement pump 41. The outlet of pump 41 is connected via conduit 42 to combustion chamber 43 which may, for example, be a suitable catalyst pack for decomposing the hydrogen peroxide. The resulting oxygen and water formed by the decomposition of hydrogen peroxide is delivered to conduit 37 to lung 21.

In operation of the system illustrated in FIG. 1, engine 10 is started by means (not shown) and the engine exhaust products, which ordinarily contain carbon dioxide, oxygen, and water vapor, are condensed in condenser 26. The exhaust products discharge into the potassium hydroxide solution in chamber 13 of housing 11, and the water vapor which has been condensed is mixed into the solution of potassium hydroxide. Carbon monoxide and carbon dioxide are absorbed by the potassium hydroxide, and free gaseous oxygen is discharged through conduit 20 to lung 21. Water, being lighter than potassium hydroxide, is skimmed off the top of chamber 13 through conduit 32 and into the lung. The water is recirculated back to chamber 13 through conduit 38. The amount of water discharged into lung 21 from chamber 13 is dependent upon the operation of thermocouple 35 on control valve 34. Preferably, control valve 34 operates to draw water through regulator 33, but if the temperature of the water 22 of lung 21 becomes too great, thermocouple 35 operates on valve 34 to draw more water into the lung. The oxygen above the water within lung 21 is drawn off through conduit 23 to the air intake of engine 10.

While oxygen is being fed to the oxygen intake of the engine, fuel in chamber 12 is drawn through conduit 17, variable delivery pump 18, and conduit 19 to the fuel inlet of engine 10. The exhaust products of engine 10 are discharged through conduit 25 into the KOH solution where the carbon dioxide and carbon monoxide is removed and the cycle continued. The increased pressure within the chamber 13 caused by the presence of the exhaust gas operates on diaphragms 15 and 16 to force more fuel from the chamber 12 and to force hydrogen peroxide from chamber 14.

The hydrogen peroxide discharged from chamber 14 is fed through variable delivery pump 41 and decomposed in decomposition or catalyst chamber 43. The mixture of oxygen and water discharged from catalyst chamber 43 is fed to lung 21 where the water is recirculated back to the KOH solution and the oxygen is drawn off for the engine. Hence, lung 21 serves to combine oxygen from the supply 14 and from recovery chamber 13.

In the event that the water within lung 21 reached too high of a temperature (as may be occasioned by the discharge of hot water and gas from catalyst 43) more water is drawn from the KOH solution to cool the lung.

Figure 2:
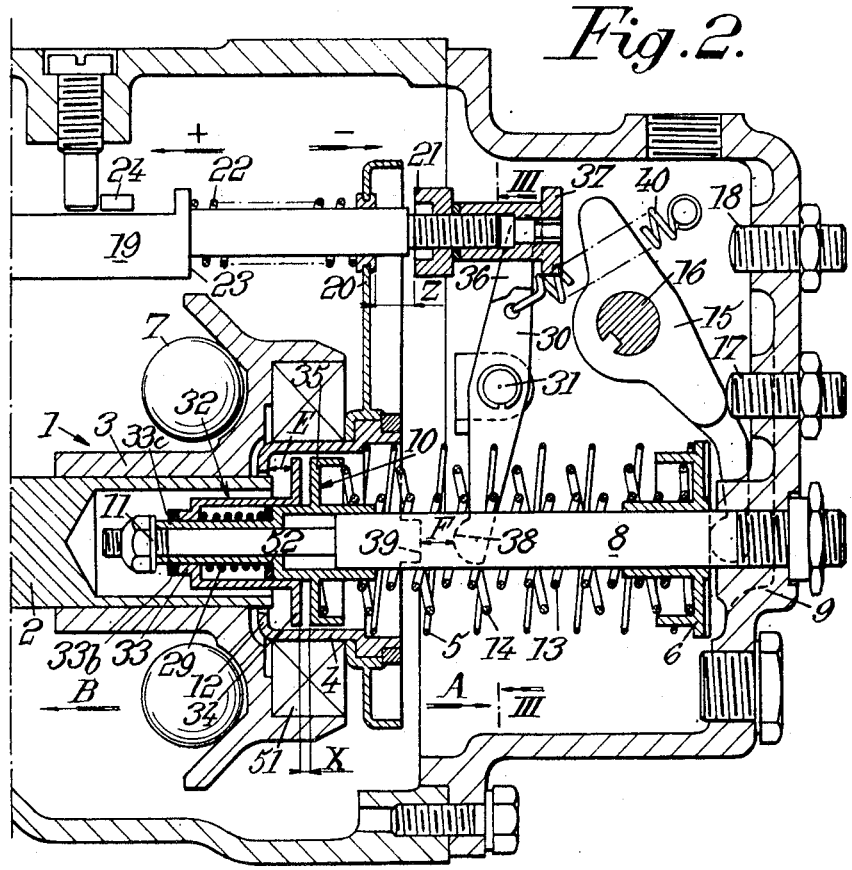
FIG. 2 is a schematic flow diagram of a modification of the system illustrated in FIG. 1 showing the presently preferred embodiment of the invention.
Figure 13:
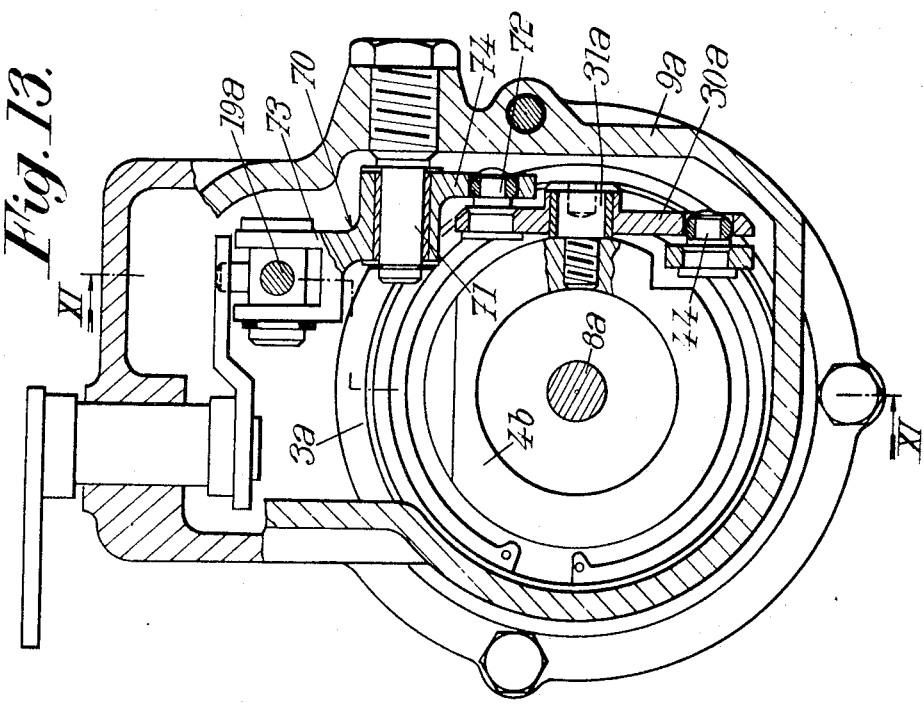
Figure 14:
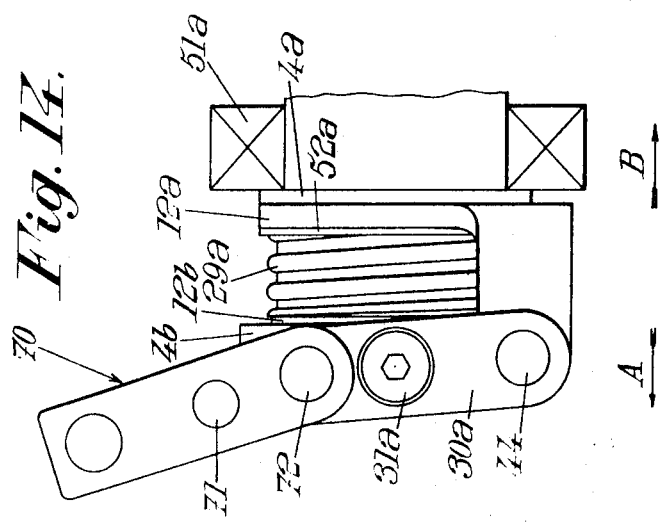
Figure 1:
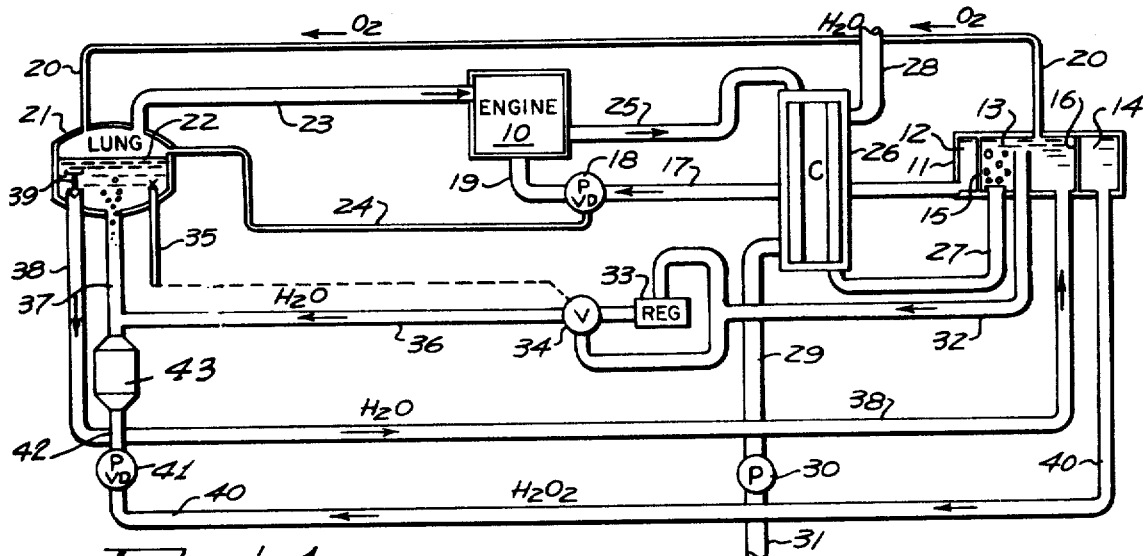
Figure 2:
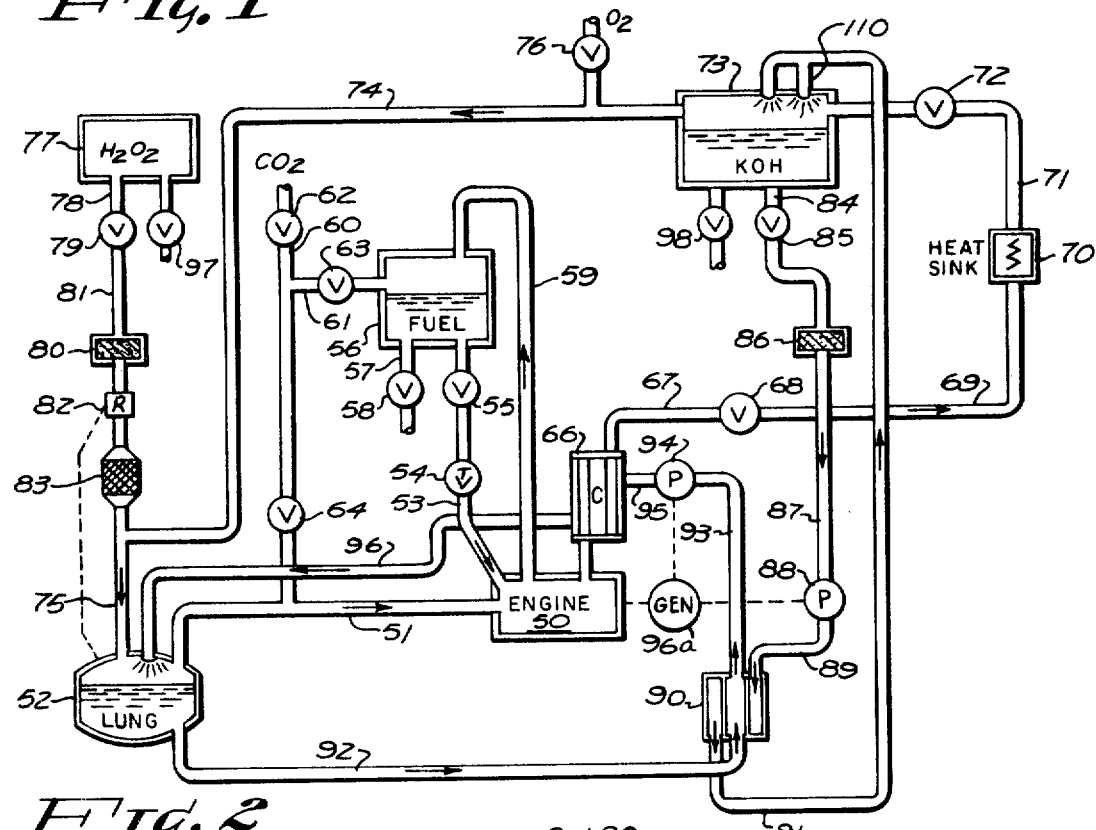

FIG. 2 illustrates the presently preferred embodiment of the present invention which is a modification of the system illustrated in FIG. 1. In FIG. 2, engine 50 has its air inlet connected to conduit 51 which in turn is connected to the outlet of lung 52. The fuel inlet for engine 50 is connected through conduit 53 to throttle valve 54 and to valve 55 and thence to container 56 which is adapted to contain fuel for engine 50. If desired, a suitable drain may be provided through conduit 57 and valve 58 for removing fuel from container 56. The fuel within container 56 is pressurized by exhaust gas through conduit 59. Also, if desired, a suitable source of inert gas such as carbon dioxide may be imposed on the fuel in chamber 56 through conduits 60 and 61 and valves 62 and 63. The source of carbon dioxide is also connected to conduit 51 through valve 64. The exhaust products of engine 50 are discharged to condenser 66 and thereafter through conduit 67, valve 68, conduit 69 to heat sink 70. The exhaust products are then discharged from heat sink 70 through conduit 71, valve 72, and into chamber 73 containing a suitable solution for removing carbon dioxide from oxygen therein. By way of example, chamber 73 may contain a solution of potassium hydroxide (KOH). The gas within chamber 73 is discharged to conduit 74 and into inlet conduit 75 to lung 52. If desired, a suitable source of oxygen may be introduced into conduit 74 via valve 76.

A source 77 of oxidizer, such as hydrogen peroxide ($H_2O_2$) is connected via conduit 78 to valve 79 and thence to filter 80 through conduit 81. Pressure regulator 82 is provided for regulating the pressure of hydrogen peroxide to catalyst pack 83 which decomposes the hydrogen peroxide to oxygen and water. The resulting mixture is discharged into lung 52. Oxygen above the water within lung 52 is discharged through conduit 51 into engine 50.

Water in the lung is cooled by potassium hydroxide solution circulated through conduit 84, valve 85, filter 86, conduit 87, to pump 88. Pump 88, which is preferably driven by engine 50, discharges the potassium hydroxide solution through the conduit 89 through condenser 90 and back to chamber 73 through conduit 91. Condenser 90 is connected through conduit 92 to the liquid within lung 52, and is connected via conduit 93 to pump 94. Pump 94 pumps liquid through conduit 95 to condenser 66 to cool the exhaust products from the engine and thence through conduit 96 back to lung 52. Thus element 66 acts as a cooler of the exhaust products from the engine, and also as a heater for the fluid in conduit 96. Pump 92 is preferably driven by engine 50. Hence, water in lung 52 is heated by KOH solution and is used to cool exhaust products from the engine.

Generator 96a is driven by engine 50 for operating the electrical apparatus within the laboratory.

Suitable drain valves 97 and 98 are provided for draining hydrogen peroxide and potassium hydroxide from the respective chambers.

In operation of the system illustrated in FIG. 2, the engine is started by initially discharging oxygen through valve 76 and conduit 74 through lung 52 to engine 50, and by pressurizing the fuel with carbon dioxide through valves 62 and 63 and discharging fuel through valves 55 and 54 to engine 50. The KOH solution is cooled by being circulated through condenser 90 and directed back to chamber 73 through atomizing jets 110, and in the process heats the water passed through conduits 93 and 96. Thus, element 90 acts as a heater in this respect. The exhaust products from the engine operates to provide sufficient pressure on the fuel and is circulated through the atomized KOH solution. The KOH solution absorbs carbon dioxide and carbon monoxide and oxygen recovered from the exhaust products is directed back through lung 52 to the engine.

Figures 3, 4:
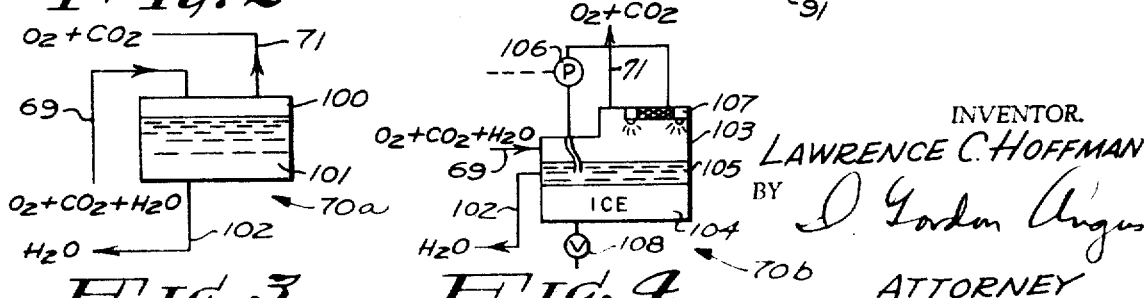
FIGS. 3 and 4 are schematic diagrams of heat sinks for use in the invention illustrated in the diagram of FIG. 2.
Figure 1:
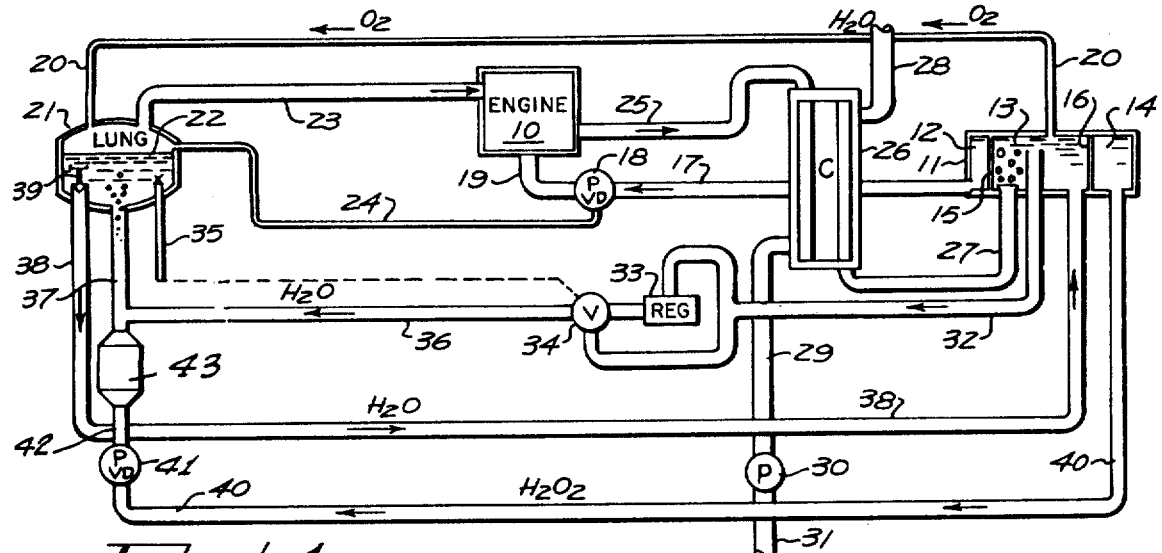
Figure 2:
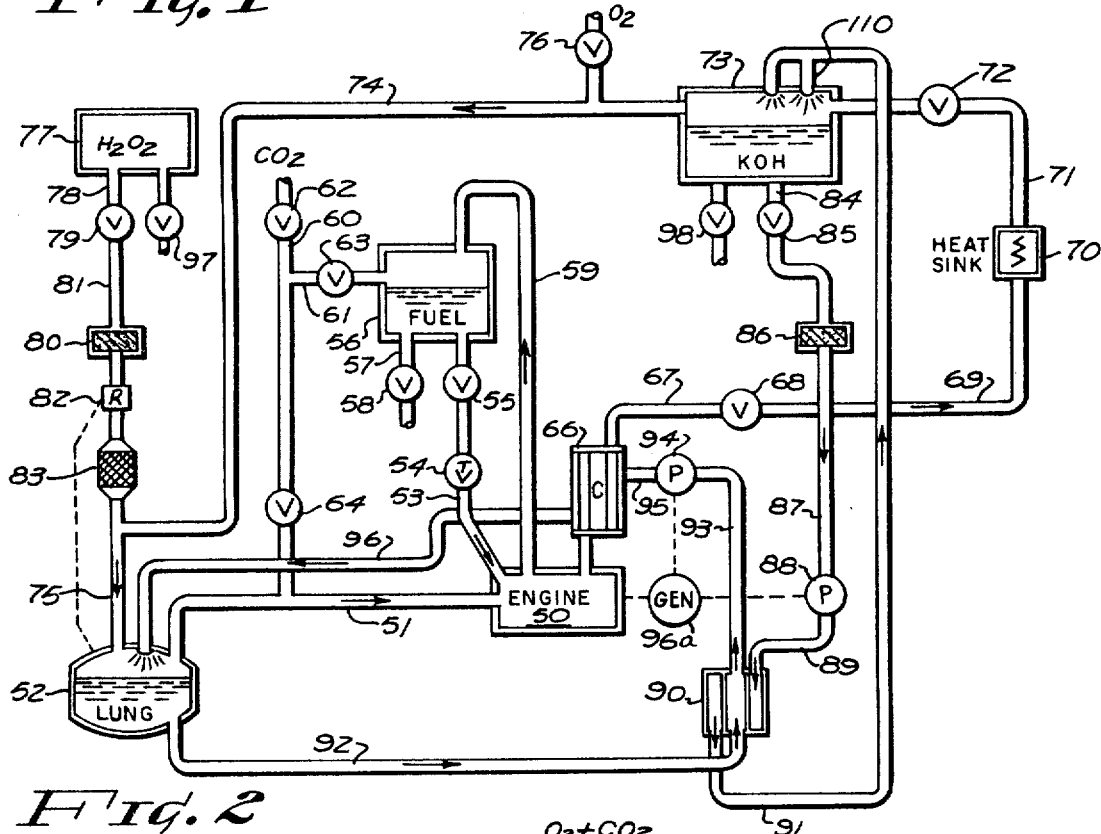
Figure 3:
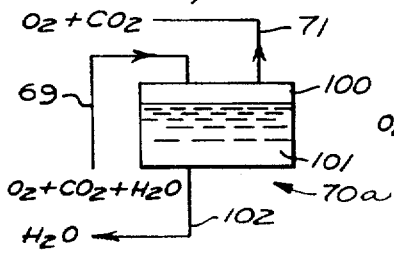
Figure 4:
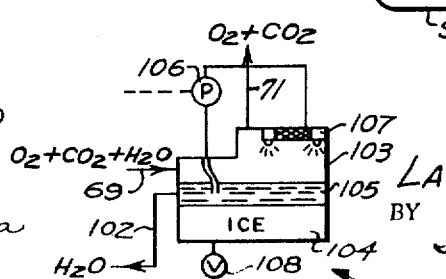
Figure 1:
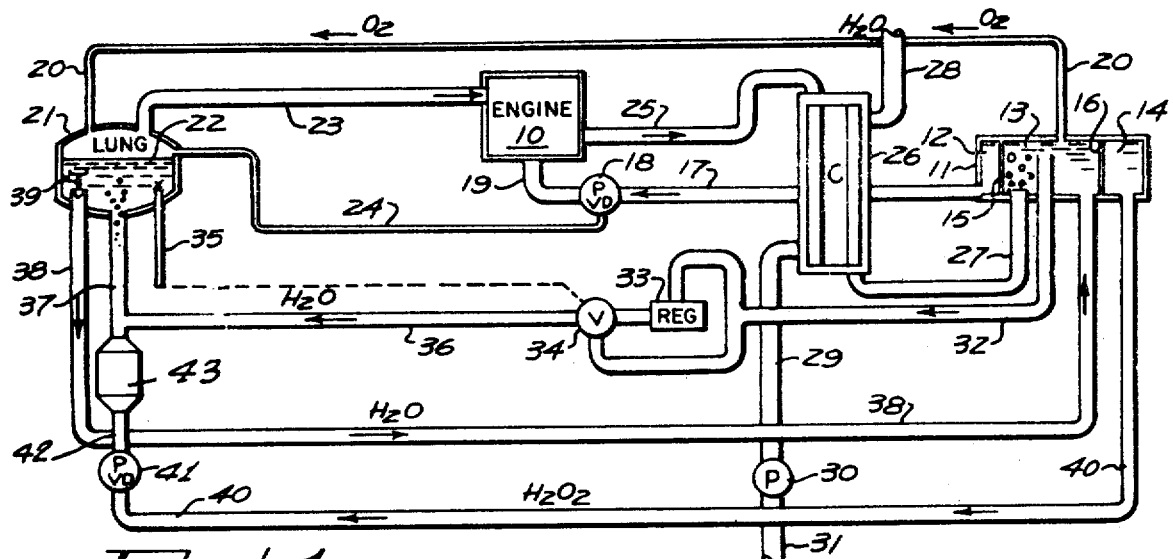
Figure 2:
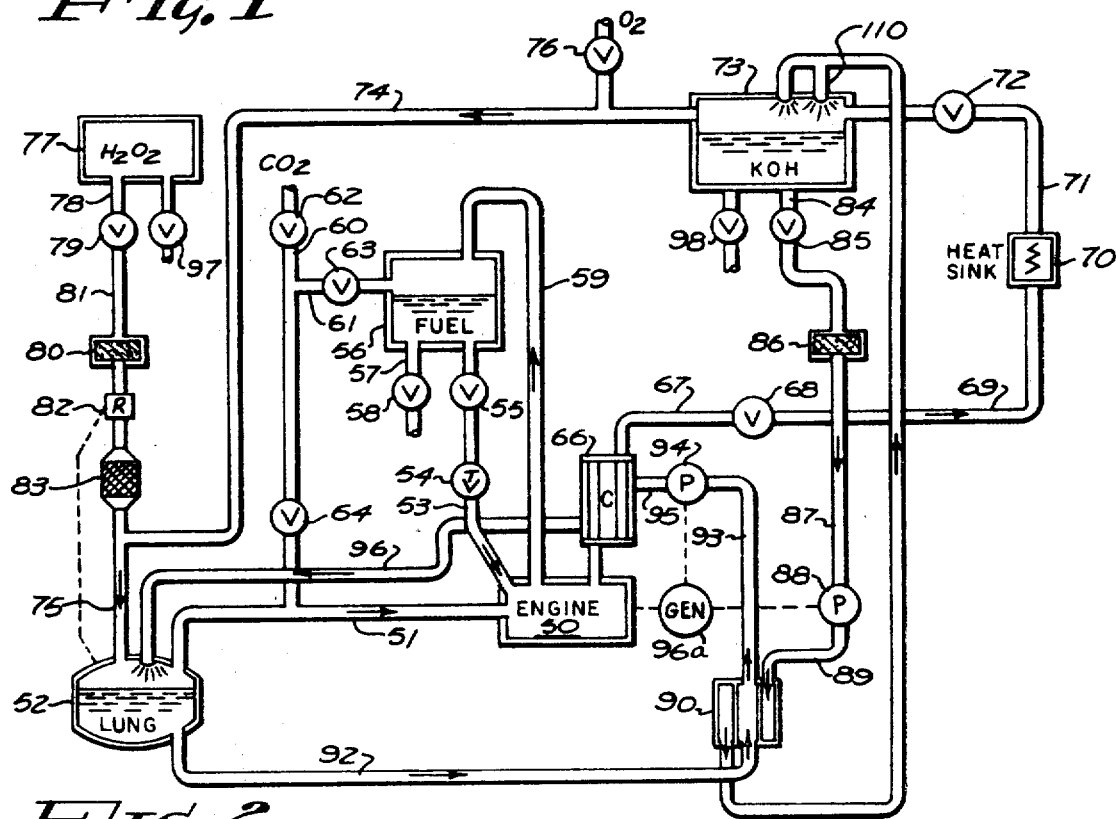
Figure 3:
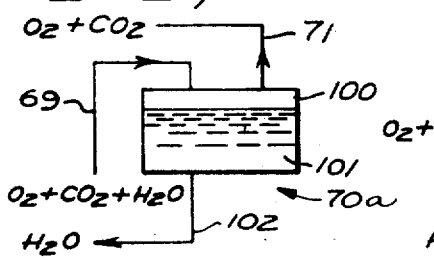
Figure 4:
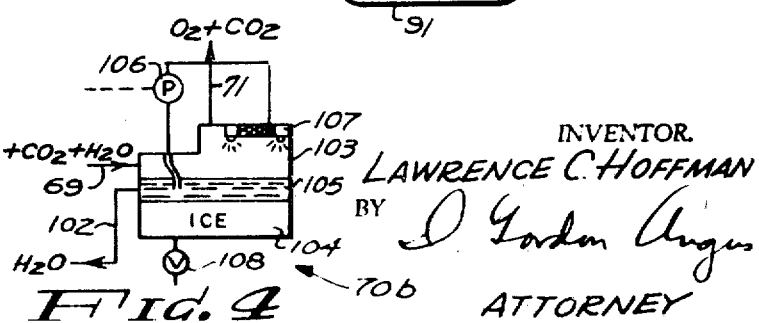

FIG. 3 illustrates one type of heat sink 70a which may be used for heat sink 70 in FIG. 2. Heat sink 70a comprises a chamber 100 containing a suitable coolant such as liquid water 101. Gaseous oxygen, carbon dioxide, and water (and sometimes carbon monoxide) is fed through conduit 69 (see FIG. 2) and into housing 100 where it is cooled by water 101. The water vapor is condensed and the oxygen and carbon dioxide are discharged through conduit 71. (See FIG. 2) Excess water is drawn off through conduit 102 which may, by way of example, be connected to conduit 92 in FIG. 2.

FIG. 4 illustrates another modification of heat sink 70b wherein housing 103 contains ice 104 and water 105 above the ice. The exhaust gas is fed through conduit 69 into the region above the water and the water condenses. The resulting oxygen and carbon dioxide are drawn off through conduit 71. Excess water is drawn off through conduit 102, which may, as in the case in FIG. 3, be connected to conduit 92 in FIG. 2. A recirculating system is provided in the embodiment illustrated in FIG. 4 whereby water is drawn off on the ice through pump 106 and sprayed back through sprayers 107. The sprayers aid in cooling the water. Pump 106 may be mechanically driven by engine 50 in FIG. 2. Preferably, drain valve 108 is provided below the ice for removing excess water and ice from the housing 103.

It is apparent that element 70 and its variations in FIGS. 3 and 4 is a condenser since it condenses out the water. Although the present invention has been described in connection with a hydrogen peroxide oxidizer, it is to be understood that any type of oxidizing agent may be utilized, such as gaseous oxygen. If gaseous oxygen is utilized instead of the hydrogen peroxide, it is to be understood that the catalyst pack may be eliminated.

The present invention thus provides a system for separating oxygen from the exhaust products of engines and recirculating such oxygen back to the intake of such engine for more effective use of the oxygen. The system is effective in operation and requires little or no maintenance. The principles of the present invention employ principles of thermodynamics and psychometrics from the fact that the total pressure in the system comprises the liquid vapor pressure plus the partial pressure of the oxygen in equilibrium with the water. This principle permits control of the entire system through the use of a single pressure regulator.

This invention is not to be limited by the embodiments shown in the drawings and described in the description, which are given by way of example and not of limitation.

What is claimed is:

1. Apparatus for supplying breathing fluid to an engine having an intake and an exhaust comprising: a source of oxygen; recovery means connected to the exhaust output of said engine to receive an exhaust from said engine for separating oxygen from said exhaust; means connected to said source of oxygen and said recovery means for combining oxygen from said source and from said recovery means; humidifier means connected to said last-named means for humidifying oxygen combined by said last-named means; and means connecting said humidifier means to the intake of said engine for supplying humidified oxygen to said engine.

2. Apparatus according to claim 1 further including condenser means connected between said exhaust output of said engine and said recovery means for condensing water vapor in the engine exhaust.

3. Apparatus according to claim 2 further including means connecting said condenser means to said humidifier means.

4. Apparatus according to claim 2 further including first cooler means connected between said condenser means and the engine output for cooling said engine exhaust.

5. Apparatus according to claim 1 further including regulator means for controlling the flow of oxygen from said source of oxygen to said combining means whereby oxygen from said source is supplementary to the oxygen from said recovery means.

6. Apparatus according to claim 1 wherein said source of oxygen includes a supply of hydrogen peroxide and means for decomposing said hydrogen peroxide.

7. Apparatus according to claim 1 wherein said recovery means includes a carbon dioxide absorbent adapted to be exposed to the engine exhaust.

8. Apparatus according to claim 7 wherein said recovery means includes spray means for spraying said carbon dioxide absorbent through the engine exhaust, and pump means connected to said engine for pumping said carbon dioxide absorbent through said spray means.

9. Apparatus according to claim 1 wherein said humidifier includes second spray means for spraying water through the oxygen passing from said combining means to said intake means.

10. Apparatus according to claim 1 wherein said humidifier means includes a supply of water adapted to be exposed to oxygen received from said combining means, heater means for heating said water, and pump means connected to said engine and operable thereby for pumping water between said humidifier means and heating means.

11. Apparatus according to claim 10 further including means connecting said heater means to said recovery means whereby said heater means is heated by fluid from said recovery means.

12. Apparatus according to claim 1 further including a supply of fuel connected to said intake means.

13. Apparatus according to claim 12 further including regulator means connected to said fuel supply and responsive to pressure in said humidifier to control flow of fuel to said intake means.

* * * * *

UNITED STATES PATENT OFFICE
CERTIFICATE OF CORRECTION

Patent No. 3,658,043      Dated April 25, 1972

Inventor(s) Lawrence C. Hoffman

It is certified that error appears in the above-identified patent and that said Letters Patent are hereby corrected as shown below:

Sheets 1-7 of the drawings and the cover sheet should be canceled and the attached sheets inserted instead therefor.

Signed and sealed this 8th day of August 1972.

(SEAL)
Attest:

EDWARD M. FLETCHER, JR.
Attesting Officer

ROBERT GOTTSCHALK
Commissioner of Patents

INVENTOR.
LAWRENCE C. HOFFMAN
BY D. Gordon Angus
ATTORNEY

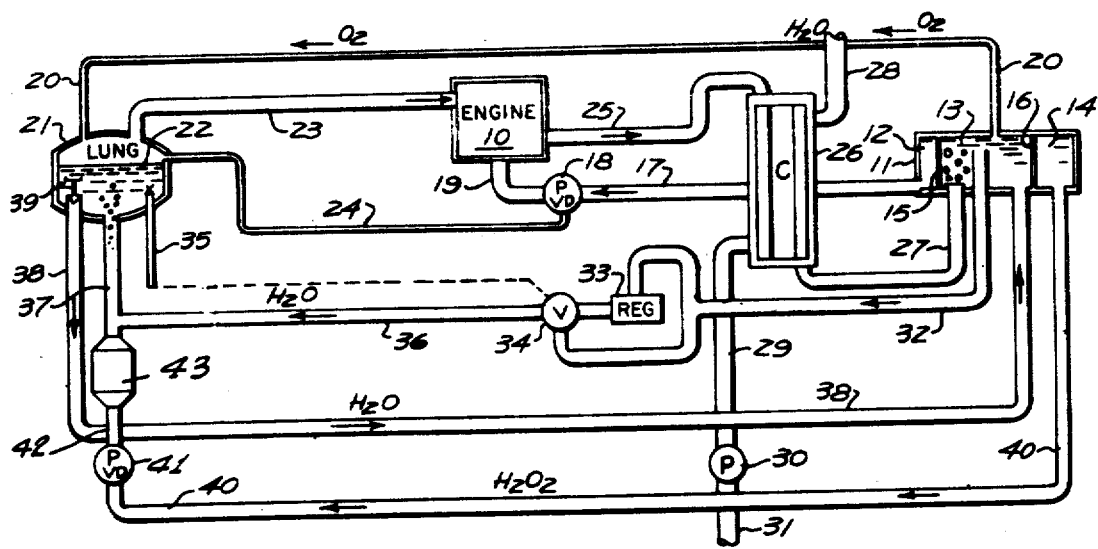

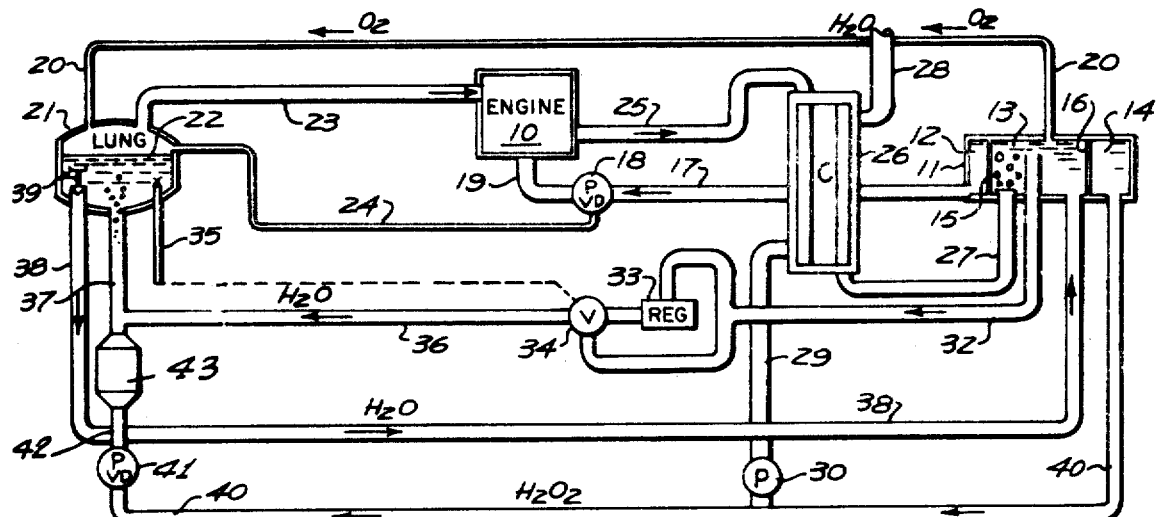
Fig. 1
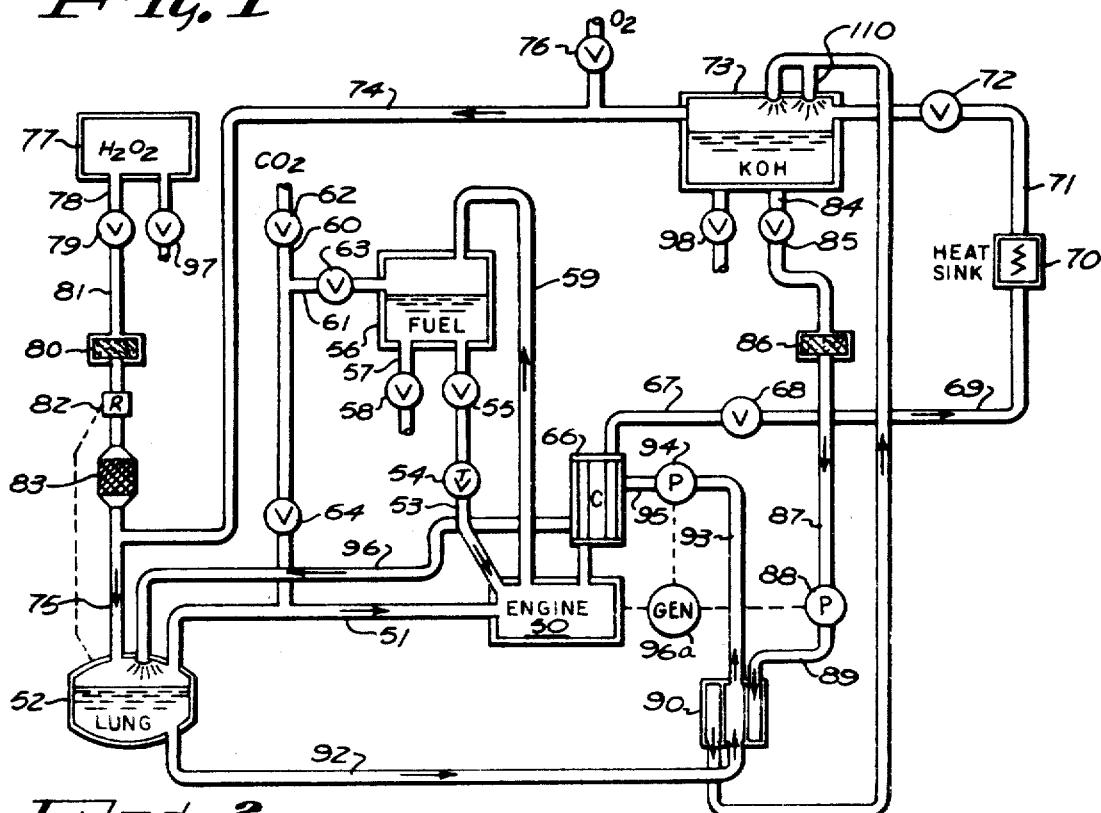
Fig. 2
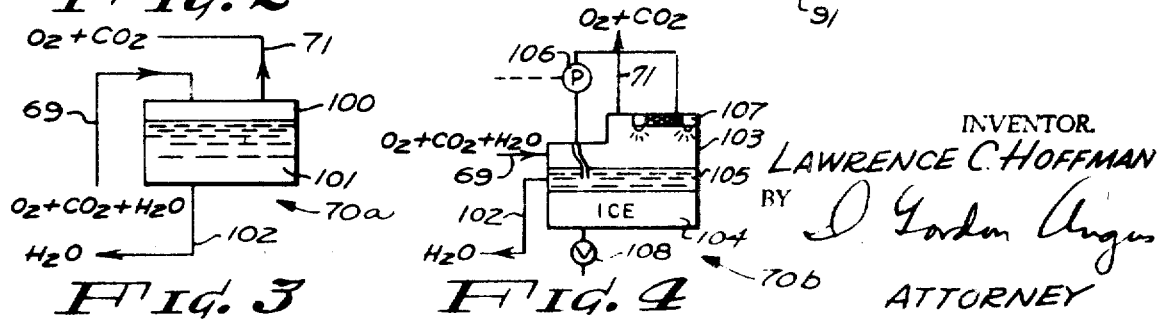
Fig. 3
Fig. 4
INVENTOR.
LAWRENCE C. HOFFMAN
BY D. Gordon Angus
ATTORNEY

UNITED STATES PATENT OFFICE
CERTIFICATE OF CORRECTION

Patent No. 3,658,043          Dated April 25, 1972

Inventor(s) Lawrence C. Hoffman

It is certified that error appears in the above-identified patent and that said Letters Patent are hereby corrected as shown below:

In the Abstract:

Line 4, after "to" insert -- admit --; same line 4, after "oxygen", second occurrence, insert -- and water vapor --. line 5, cancel "and water vapor"; lines 9 and 10, "additional" should read -- generated --.

Signed and sealed this 27th day of March 1973.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,658,043      Dated April 25, 1972

Inventor(s) Lawrence C. Hoffman

It is certified that error appears in the above-identified patent and that said Letters Patent are hereby corrected as shown below:

Sheets 1-7 of the drawings and the cover sheet should be canceled and the attached sheets inserted instead therefor.

This certificate supersedes Certificate of Correction issued August 8, 1972.

Signed and sealed this 11th day of March 1975.

(SEAL)
Attest:

RUTH C. MASON
Attesting Officer

C. MARSHALL DANN
Commissioner of Patents
and Trademarks

INVENTOR.
LAWRENCE C. HOFFMAN
BY D. Gordon Angus
ATTORNEY

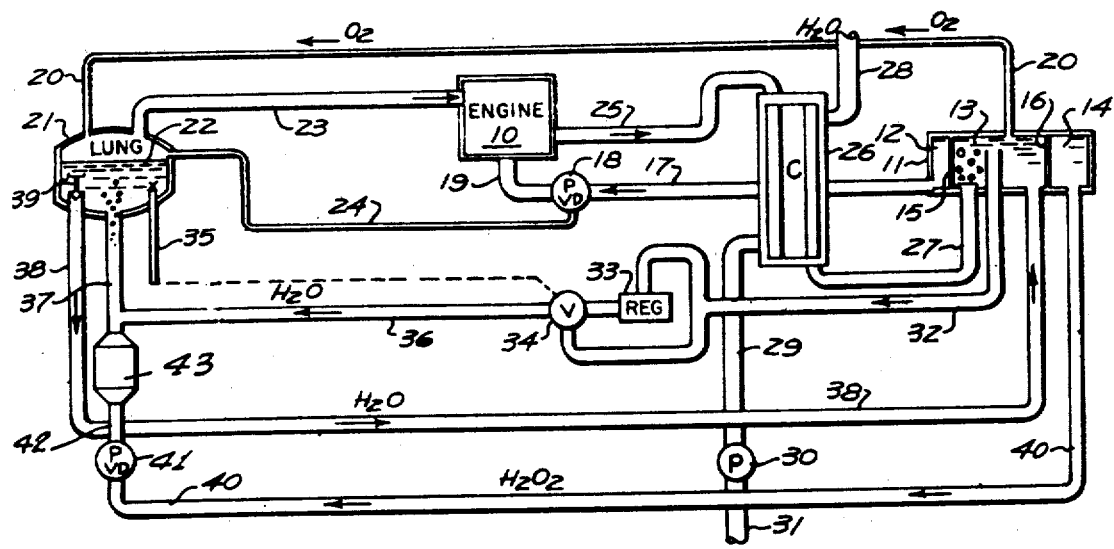

INVENTOR.
LAWRENCE C. HOFFMAN
BY D. Gordon Angus
ATTORNEY